Oct. 4, 1955  W. J. MENNE  2,719,765
SUPPORT BEARING AND PROCESS OF CONSTRUCTING SAME
Filed Sept. 12, 1950
Fig. 1
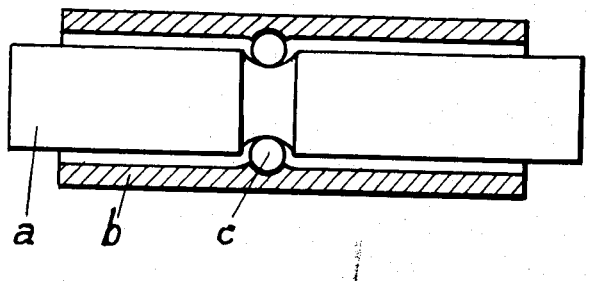
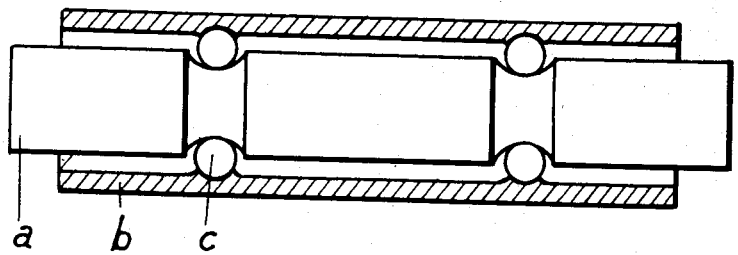
Fig. 2
INVENTOR:
WILHELM J. MENNE
By Wenderoth, Lind & Ponack
ATTORNEYS

United States Patent Office 2,719,765
Patented Oct. 4, 1955

2,719,765

SUPPORT BEARING AND PROCESS OF CONSTRUCTING SAME

Wilhelm J. Menne, Weil (Rhine), Germany, assignor to Guillaume Frank

Application September 12, 1950, Serial No. 184,404

Claims priority, application Germany September 13, 1949

2 Claims. (Cl. 308—193)

The present invention has for its object the construction of ball bearings, giving, in certain cases, new possibilities of construction, these bearings being of a simplified construction. These bearings can be used in light mechanical assemblings, in all cases where the small dimensions of ordinary ball bearings cause interference, and where assembling costs are a determining factor.

In ball bearings in use up to the present time, utilization is made of hardened bearing bushings, treated and trued, to form the ball race.

Or else, ordinary mass-produced ball bearings are used, or if the construction of the apparatus does not permit using these, special bearing bushing shields are made and, if necessary, the spacing between the balls is maintained by means of intermediary cylinders.

Thanks to this invention the assembling of such bearings is simplified and made more economical in the cases where ordinary mass-produced ball bearings cannot or should not be used and in the cases where it is not necessary to maintain a very great precision in the rolling movement.

A characteristic feature of the present invention is the fact that a row of hardened steel balls, in a groove of the shaft, are force-fitted into a cylinder possessing a slightly less bore and this row of balls is forced just to the desired position, the shaft being then forced to rotate in reference to the cylinder, so that the rolling balls form their own race in the cylinder wall and in such a manner that, because of the effect accompanying the formation of the border flange, a deeper ball race is formed.

This invention also applies to supporting bearings for revolving shafts constructed by this invention process or by similar processes.

The process and the bearings permitting to accomplish the preceding objects, present characteristics resulting from the hereinafter description and notably the annexed claims.

The object of this invention is explained in a method of assembling, given as an example, and by aid of the attached designs, in which:

Figure 1 represents a schematic cross-section of a single row ball bearing assembly made in accordance with this invention.

Figure 2 likewise represents a schematic cross-section of a similar bearing assembly having two rows of balls.

On the shaft $a$, there is formed by turning one (Figure 1) or several (Figure 2) semicircular grooves into which the hardened steel balls are to be placed. The inside diameter of the cylinder $b$, is very slightly less than the outer diameter of the row of balls $c$, when assembled, the cylinder $b$, is force-fitted onto the shaft having the ring of balls, until it is just in the desired position in reference to the cylinder $b$. The shaft is then forcefully rotated on its own axis, the cylinder being held fixed and this is continued until each ball has formed, by stamping of the cylindrical inner wall metal, its own race in the said wall. This action causes a deformation of the metal of the shaft and of the cylinder which causes a hardening of the metal along the races. At the same time the metal is raised in the form of a flange along the race in the cylinder, thus producing a much deeper race. Because of this fact the bearing can support certain longitudinal forces without causing objectional looseness.

Certain properties can be previously given to the material, of which the shaft or the cylinder is made, by alloy or treating processes, so that the deformation resulting from the rolling of the row of balls causes a very high degree of hardness for the races.

I claim:

1. A process for manufacturing bearings for supporting shafts rotating in hollow cylindrical bodies comprising forcibly fitting a crown of balls of hard metal, held in an annular groove of the shaft, in a support cylinder forming the body of the bearing and having an internal diameter slightly smaller than the exterior diameter of said crown of balls, then pushing axially the shaft carrying said crown of balls into the support cylinder to the desired position, then rotating said shaft in said cylinder in such a manner that the balls impress concavely in the hollow face of said cylinder an annular race groove with edges raised to form a collar by the compression of the metal, said shaft thus remaining axially immobilized in said support cylinder and the entire assembly forming a ball bearing.

2. In a support bearing for a rotary shaft the combination of a rotary shaft in which there is provided a circular groove, a crown of balls of hard metal projecting out of said groove and partially engaging said circular groove, a hollow cylindrical body forming a coaxial bearing for the rotary shaft, and surrounding said shaft as well as the crown of balls, said hollow cylindrical body being of an interior diameter less than the exterior diameter of said crown of balls and presenting interiorly an annular groove of semicircular cross section having the edges thereof raised with relation to the interior wall of said hollow cylindrical body forming a raceway, the balls of said crown of balls being partially engaged in said raceway.

References Cited in the file of this patent

UNITED STATES PATENTS

| | | |
|---|---|---|
| 1,146,272 | Neukirch | July 13, 1915 |
| 2,223,799 | Annen | Dec. 3, 1940 |
| 2,427,072 | Rubin | Sept. 9, 1947 |

FOREIGN PATENTS

| | | |
|---|---|---|
| 552,180 | Great Britain | Mar. 25, 1943 |